Sept. 8, 1925.
G. M. DAVIES ET AL
1,553,032
MACHINE FOR DOUBLING TIN PLATES OR SHEETS
Filed Aug. 7, 1922     3 Sheets-Sheet 1
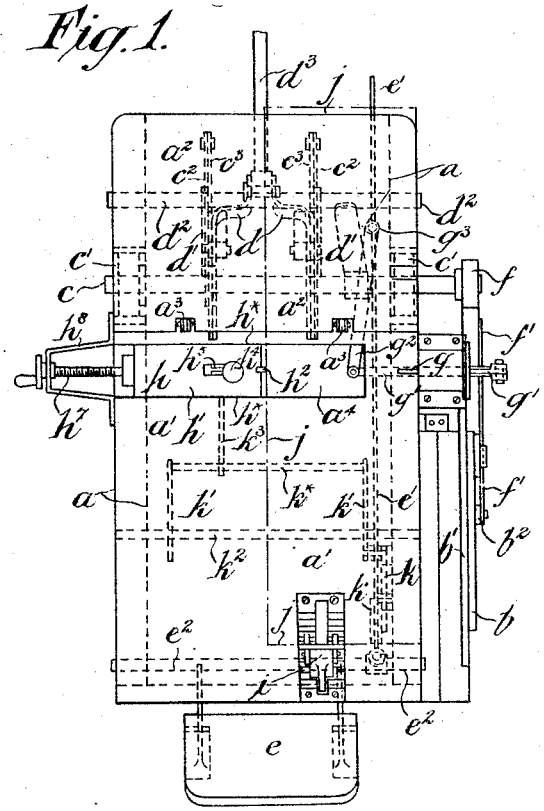
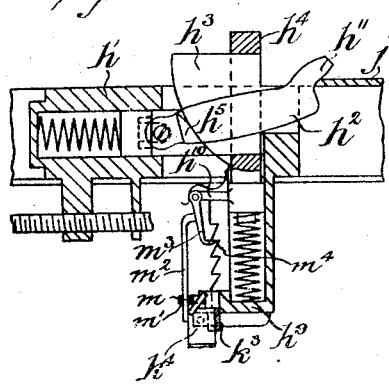
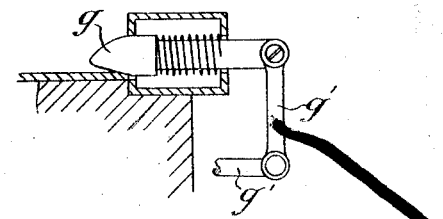
INVENTORS
G. M. DAVIES
W. M. DAVIES
F. F. EDWARDS,
By    Atty.

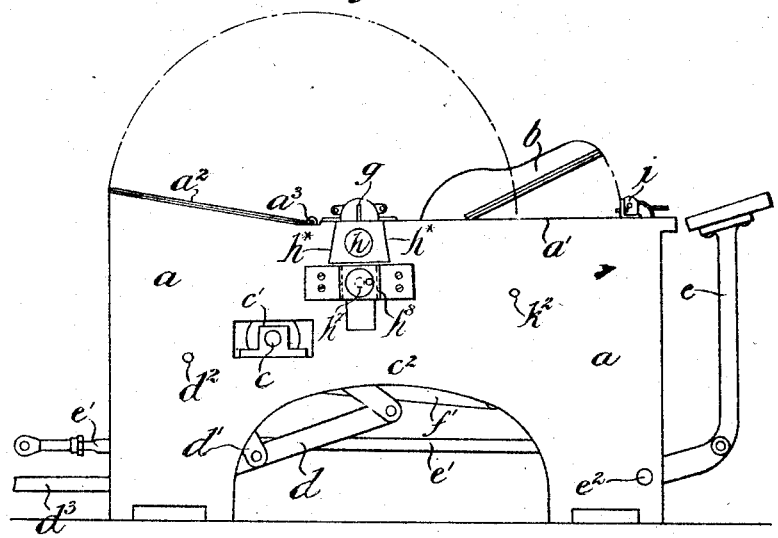
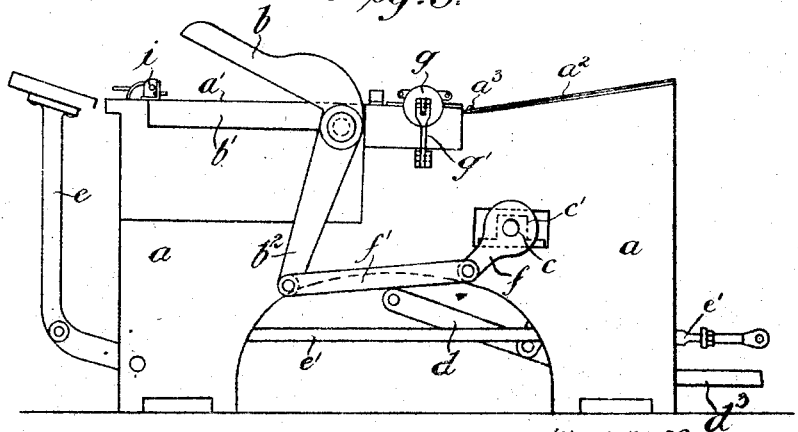

Sept. 8, 1925.

G. M. DAVIES ET AL 1,553,032

MACHINE FOR DOUBLING TIN PLATES OR SHEETS

Filed Aug. 7, 1922　　3 Sheets-Sheet 3

INVENTORS
G. M. DAVIES
WM. DAVIES
F. F. EDWARDS
By
D. M. Mochauffer Atty.

Patented Sept. 8, 1925.

1,553,032

UNITED STATES PATENT OFFICE.

GEORGE MORGAN DAVIES, WILLIAM DAVIES, AND FREDERICK FOX EDWARDS, OF LLANELLY, WALES.

MACHINE FOR DOUBLING TIN PLATES OR SHEETS.

Application filed August 7, 1922. Serial No. 580,195.

*To all whom it may concern:*

Be it known that we, GEORGE MORGAN DAVIES, WILLIAM DAVIES, and FREDERICK FOX EDWARDS, subjects of the King of Great Britain and Ireland, and residents of Llanelly, county of Carmarthen, Wales, have invented a certain new and useful Improvement in a Machine for Doubling Tin Plates or Sheets, of which the following is a specification.

This invention has for its object the provision of a simple and efficient machine for doubling, folding, squeezing, and pressing plates in sheet, steel, tin-plate and similar factories where sheets and plates require doubling, squeezing, pressing and bending with a minimum amount of manual labour.

In order that the invention may be readily understood, reference is to be had to the following description and accompanying sheets of drawings, wherein:—

Figure 1 is a plan view of a machine constructed in accordance with the invention.

Fig. 2 is a left hand side view of said machine.

Fig. 3 is a right hand side view thereof.

Fig. 6 is a vertical sectional view of the left hand adjustable gage drawn to an enlarged scale.

Fig. 7 is a vertical sectional view of the right hand gage, also drawn to an enlarged scale.

Like letters of reference indicate corresponding parts in the several figures.

In carrying out the invention, the machine consists of a substantially horizontal table top carried by a suitable standard or frame $a$, said table top comprising a fixed and stationary portion $a'$ and a movable portion $a^2$ hingedly connected to the fixed portion $a'$, said movable portion $a^2$ being connected to the fixed portion $a'$ by means of spring-controlled rising and falling hinges $a^3$, the machine being so positioned that the table top thereof is level with the flooring plates of the tin or other mill, thus enabling the roller-man to throw the sheet coming from the rolls on to the table, the shears $b$, $b'$ of the machine being arranged towards the off side of said machine, as shown in Figs. 1 to 4 of the accompanying drawings.

The movable part $a^2$ of the table top, i. e. the doubler, (commonly termed "squeezer") is connected to a reciprocatory crank shaft $c$ carried in bearings $c'$ in the frame $a$ by means of a pair of arms $c^2$ carried by said shaft $c$, said arms $c^2$ at their upper end being pivotally connected to the underside of the "squeezer" $a^2$ by means of a pair of links $c^3$, whilst the lower ends of said arms $c^2$ are pivotally connected to a U-shaped member or frame $d$ pivotally connected to a pair of links $d'$ carried by a transversely disposed shaft $d^2$ rockably mounted in the machine frame $a$, said frame or member $d$ being by its front end connected by a rod or the like $d^3$ with the mill rolls, whilst at the rear end of the machine there is provided a foot lever $e$, which is connected up by a bar or the like $e'$ with the cup or friction crab of the rolls for putting the machine in action, said foot lever $e$ being carried by a transversely disposed shaft $e^2$ mounted in the frame $a$ of the machine.

The crank shaft $c$, which crank shaft $c$ extends beyond the off side of the machine, is connected by crank $f$ and connecting link $f'$ with the depending arms $b^2$ of the movable shear blade $b$, said movable shear $b$ being pivotally mounted on the frame $a$, whilst the other blade $b'$ is fixedly secured thereto.

Figure 4:
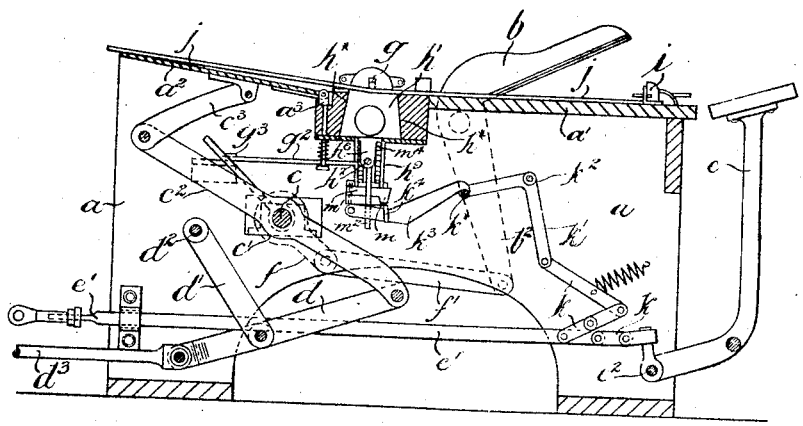
Fig. 4 is a longitudinal sectional view thereof, parts being shown in inoperative position.
Figure 5:
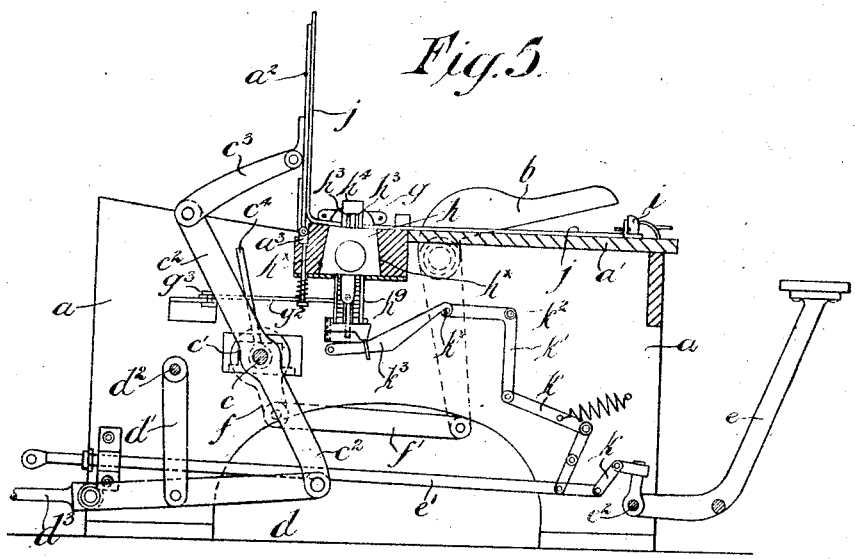
Fig. 5 is a similar view but showing the parts in operative position.

On the shear or off side of the machine, and near to the joining of the table parts $a'$, $a^2$, there is arranged a spring-controlled plunger, indicated as a whole by reference letter $g$, said plunger or side gage, shown on an enlarged scale in Fig. 7, being connected by rods or the like $g'$ to an horizontally disposed bar $g^2$ whose other end $g^3$ is pivotally connected to the frame $a$, Figs. 1, 4 and 5.

On the other side of the table and in line with the gage $g$ and transversely of the table top there is arranged a second side gage, indicated as a whole by reference letter $h$, said gage $h$ being depressible into the table top and also adjustable to suit the width of the sheet to be doubled.

This side gage $h$ consists, as shown in Fig. 6, of a box-like frame $h'$ slidably mounted in guideway $h^*$ in the table top, said box $h'$ being provided interiorly with a spring-controlled finger $h^2$ slidable through rearwardly extending curved plates $h^3$ which are fixedly carried by a vertically disposed spring-controlled and slotted rod $h^4$ slidable in said box frame $h'$, said curved plates $h^3$ bearing each on a cam surface $h^5$ on each side of the finger or arm $h^2$ which is adapted to be protruded upwardly through a slot $a^4$ in the table top to engage a side of a sheet, whilst at the rear end of the table top there is arranged a third gage $i$ which is adjustable or shiftable longitudinally of the table top by the doubler-man to suit the length of the sheet to be doubled.

In order to shift the gage $h$ transversely, the box frame $h'$ is on its underside provided with a threaded boss $h^6$ in which engages a handled screw $h^7$ rotatably mounted in a bracket $h^8$ fixedly secured to the near side of the machine, movement of said gage $h$ being according as the screw is rotated.

In practice, the roller-man throws a sheet on to the table top, the doubler-man then places said sheet indicated by dot-and-dash lines $j$ in Fig. 1 and by full lines $j$ in Figs. 4 and 5, against the gages $g$ and $i$ and then depresses the foot lever $e$. This depression of the foot lever $e$ causes, through a system of pivotally mounted levers $k$, connected with the rocker shaft $e^2$ thereof, the rocking of a bell crank lever $k'$ carried by a transversely disposed shaft $k^2$, the rocking of said lever $k'$ lifting by its connecting bar $k$ the free end of a lever $k^3$ pivotally mounted on the lower end of the slotted casing $h^9$, in which is slidable the spring-controlled rod $h^4$, Figs. 4, 5 and 6. This lever $k^3$ carries an inclined extension or plate $k^4$ which bears against an inclined extension or plate $m$ carried by a lever $m'$ pivotally mounted on the casing $h^9$, and through said lever $m'$ freely extends the end of a rod $m^2$ which carries a spring-controlled pawl $m^3$ pivotally mounted on an arm $h^{10}$ on the lower part of the rod $h^4$ said arm, $h^{10}$ extending through the slot of the casing $h^9$, said pawl $m^3$ engaging in ratchet teeth $m^4$ on the casing $h^9$.

With the above arrangement there obtains, on the lifting of the lever $k^3$, the outward movement of the lever $m'$ and consequently the disengagement of the pawl $m^3$ from the ratchet teeth $m^4$, whereupon the rod $h^4$, under the action of its spring, rises and allows the finger $h^2$, under the action of its spring, to move forward and upward and by its L-shaped end $h^{11}$, engage the side of the plate $j$, as in Fig. 6, said plate $j$ being thus securely held in position between the gages $g$, $h$ and $i$.

At the same time as the above takes place, the movement of the rod or bar $e'$, by the depression of the foot lever $e$, puts in action the cup or friction crab, making working connection through the rod $d^3$ between the mill rolls or other power and the swinging frame $d$, causing said frame $d$ to rock and with it the arms $c^2$ and through the links $c^3$ connected to said arms $c^2$ and the "squeezer" $a^2$ to swing the same upwards and over, doubling the sheet upon itself as the "squeezer" flattens the sheet, the spring-controlled hinges $a^3$ allowing the hinged end of the said "squeezer" $a^2$ to rise and accommodate itself to the thickness of the sheet thus doubled.

As the "squeezer" nears the completion of its stroke, it engages the upper end of the rod $h^4$ of the gage $h$ and depresses said rod $h^4$ against the action of its spring, whilst the downward movement of the rod $h^4$, through the curved plates $h^3$ thereof acting on the cam surfaces $h^5$ of the finger $h^2$, forces said finger $h^2$ backwards against the action of the spring thereof, drawing said finger $h^2$ out of engagement with the plate $j$ till the gage is flush with the table top, whereupon the gage is locked in its lowest position by reason of the spring-controlled pawl $m^3$ engaging in the lowermost of the ratchet teeth $m^4$.

At the same time a wiper $c^4$ fixedly mounted on the crank shaft $c$ pushes outwards the pivotally mounted bar $g^2$ and with it the rods $g'$ drawing back the plunger gage $g$ against the action of its spring, thus freeing the other side of the plate $j$, enabling said sheet to be moved.

The doubler-man then turns the sheet to bring, in turn, the raw, but not the folded, edges to between the shears $b$, $b'$ and again depresses the foot lever $e$, causing the crank shaft $c$ to rock again and the shear blade $b$, through the intermediary of the crank $f$ and connecting link $f'$, to move down, making the cut, the "squeezer" $a^2$ making an idle stroke while shearing is taking place, said second depression releasing the side gages which return to normal position ready to receive another sheet, and so on with each succeeding sheet.

With a machine as above set forth there obtains the great advantage that the loss of sheets through overheating is obviated, inasmuch as sheets which are comparatively cool can easily be doubled without impairing the surface, quality and quantity of sheets. Further, the machine is only in operation as and when required, whereas the present day machines are constantly in motion, although not performing a doubling or a shear, that is to say, there is no sheet in the machine, thus effecting a great saving in wear and tear of said machine.

We claim:—

1. A tin-plate or sheet doubling machine, characterized by a frame, a horizontally disposed two-part table top thereto, constituted by a stationary part and a movable part or "squeezer," spring-controlled rising and falling hinges to said "squeezer," a rocking shaft with arms thereto located beneath the table top, a swinging frame pivotally connected to the lower ends of said arms, links pivotally connected to the upper ends of said arms and to the underside of the "squeezer," a rod connecting the swinging frame up with a source of power, pedal-actuated means for setting in action said source of power, a spring-controlled off-side plunger or gage and means for actuating the same, a spring-controlled depressible and adjustable near-side gage and means for actuating the same, and a longitudinally adjustable end gage, as herein described, to receive the plate or sheet to be doubled.

2. A tin-plate or sheet doubling machine, characterized by a frame, a horizontally disposed two-part table top thereto, constituted by a stationary part and a movable part or squeezer, spring-controlled rising and falling hinges to said squeezer, a rocking shaft with arms thereto located beneath the table top, a swinging frame pivotally connected to the lower ends of said arms, links pivotally connected to the upper ends of said arms and to the underside of the squeezer, a rod connecting the swinging frame up with the source of power, pedal-actuated means for setting in action said source of power, a spring-controlled off-side plunger or gage and means actuating the same, a spring-controlled depressible and adjustable near-side gage and means for actuating the same, a longitudinally adjustable end gage, as herein described, to receive the plate or sheet to be doubled, and shears operatively connected with the rocker shaft of the squeezer to move simultaneously therewith.

3. A tin-plate doubling machine comprising in combination a frame, a horizontally disposed table top supported by the frame and including a stationary part and a movable part, a swinging frame located beneath said table top and operatively connected with the movable part thereof, means connecting the swinging frame with a source of power, a spring-controlled off-side gage, means for actuating the same, a spring-controlled near-side gage, means for actuating the same, and a longitudinally adjustable end gage.

4. A tin-plate doubling machine comprising a table top including a fixed section and a movable section, spring-controlled rising and falling hinges carrying said movable section, a swinging frame operatively connected with the moving section, gripping means adjacent said hinges for engaging a plate positioned on said table top, and means for simultaneously controlling the operation of said swinging frame and gripping means.

In testimony whereof we have affixed our signatures hereto this nineteenth day of May 1922.

GEORGE MORGAN DAVIES.
WILLIAM DAVIES.
FREDERICK FOX EDWARDS.